United States Patent [19]

van der Lely

[11] 4,270,615
[45] Jun. 2, 1981

[54] SOIL CULTIVATING DEVICES

[76] Inventor: Cornelis van der Lely, 7, Brüschenrain, Zug, Switzerland

[21] Appl. No.: 963,175

[22] Filed: Nov. 24, 1978

[30] Foreign Application Priority Data

Nov. 30, 1977 [NL] Netherlands .......................... 7713196
Nov. 30, 1977 [NL] Netherlands .......................... 7713197

[51] Int. Cl.³ .......................................... A01B 33/06
[52] U.S. Cl. ........................................ 172/49; 172/63
[58] Field of Search ....................... 172/59, 67, 70, 73, 172/768, 48, 49, 57, 58, 111, 63, 66

[56] References Cited

U.S. PATENT DOCUMENTS

| 28,687 | 6/1860 | Pomeroy | 172/58 |
| 2,088,141 | 7/1937 | Royston | 172/111 X |
| 3,108,645 | 10/1963 | Hill | 172/59 |
| 3,111,917 | 11/1963 | Dawrs | 172/59 X |
| 3,233,686 | 2/1966 | Steadman | 172/123 |
| 3,367,425 | 2/1968 | Heeren | 172/59 X |
| 3,616,862 | 11/1971 | Lely | 172/59 |
| 4,148,364 | 4/1979 | Scharmann | 172/59 |

FOREIGN PATENT DOCUMENTS

| 103567 | 4/1898 | Fed. Rep. of Germany | 172/57 |
| 7509003 | 1/1976 | France | 172/59 |

Primary Examiner—Richard J. Johnson
Attorney, Agent, or Firm—William B. Mason

[57] ABSTRACT

An implement has a row of plough bodies mounted to rotate about upwardly extending axes defined by shafts that are inclined in the normal direction of travel. The plough bodies are flat support members with side edges that taper downwardly. The side edges are bent over parts that releasably mount straight blades and the upper ends of the supports have fastening plate portions bolted to their shafts. A circular protective screen and circular plate interfit at the junction of the shaft and fastening portion of each plough body. The shafts have intermeshed pinions with a central one of the shafts extending into a lower gear box that houses exchangeable pinions. The central shaft mounts one of the pinions that engages a second pinion having a respective shaft that extends through a cover into a second gear box and a gear wheel housed therein. The gear wheel engages a further gear wheel on an input shaft that is connectable to the p.t.o. of a tractor. The pinions can be interchanged by unfastening the cover and removing same together with the second gear box, including both gear wheels. Cutter knives are positioned forward of the plough bodies between the bodies. During operation, the knives cut slices of soil which are cut into lumps by the rotating bodies. The lumps are guided by the support members and ribs thereon so that the lumps are raised, inverted and deposited in a new furrow. Tines at the rear of the plough bodies serve to retain and crumble the soil lumps. Wheels on the implement frame can be vertically adjusted to regulate the working levels of the knives and plough bodies.

13 Claims, 4 Drawing Figures

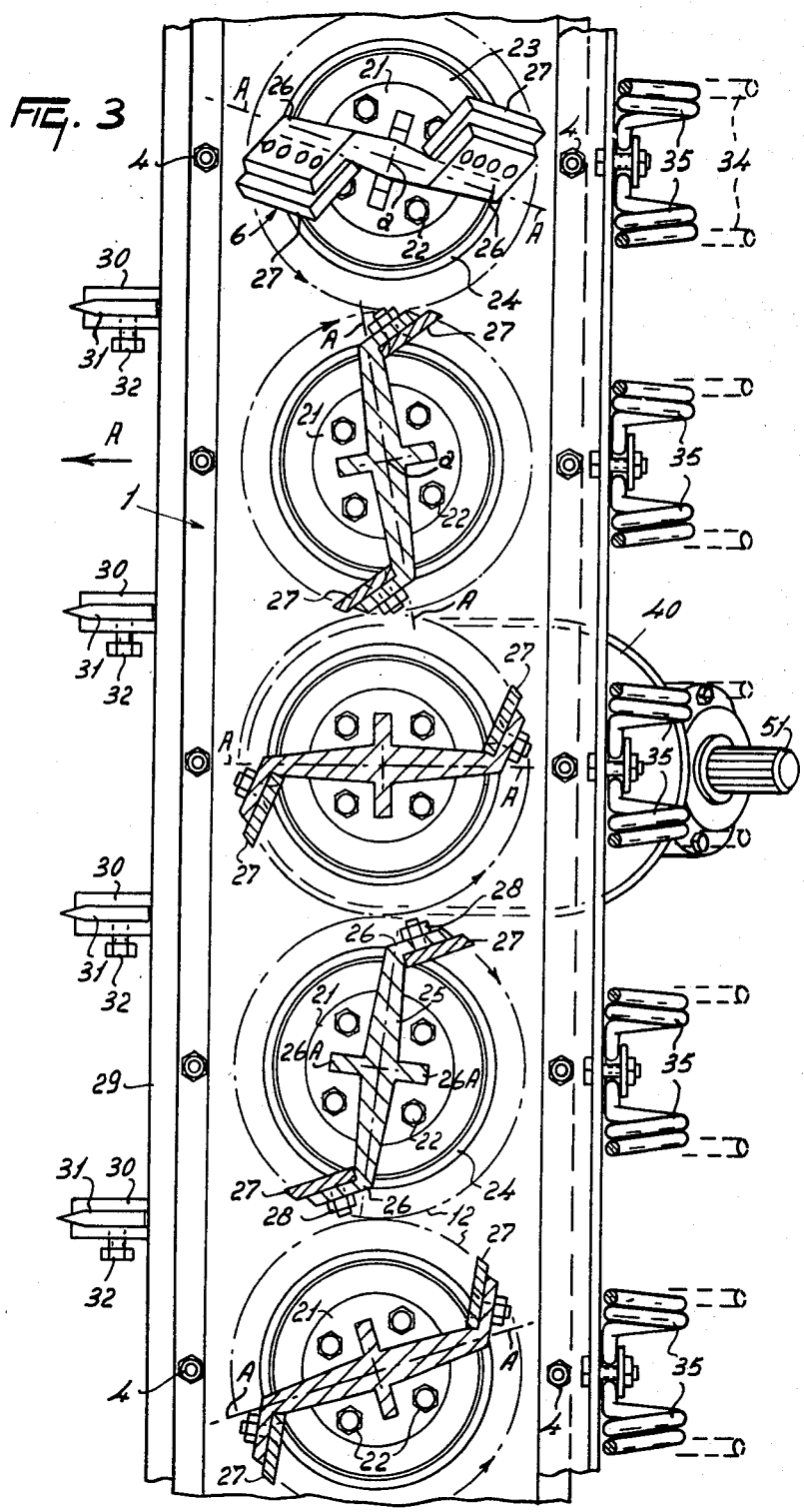

SOIL CULTIVATING DEVICES

This invention relates to soil cultivating devices.

According to the present invention there is provided a soil cultivating device comprising a frame and a plurality of rotatable plough bodies journalled in this frame, at least one of these plough bodies comprising, with respect to the intended direction of operative travel of the device, a rearwardly and downwardly extending supporting member having at least one cutting member at its circumference.

The invention also provides a soil cultivating device comprising a frame and a plurality of rotatable plough bodies journalled in this frame, at least one of these plough bodies being rearwardly and downwardly extending with respect to the intended direction of operative travel of the device and being constructed so that during its rotation a slice a soil is cut loose on the lower side of this plough body, subsequently inverted and disengaged on the top side of this plough body.

Also the invention provides a soil cultivating device comprising a frame and a plurality of rotatable plough bodies journalled in this frame, at least one plough body comprising a supporting member extending rearwardly and downwardly with respect to the intended direction of operative travel of the device and having two sides inclined with respect to the rotary axis of the plough body.

Further the invention provides a soil cultivating device comprising a frame and a plurality of rotatable plough bodies journalled in this frame and arranged in a row transverse of the intended direction of operative travel of the device, wherein two immediately neighbouring bodies extending rearwardly and downwardly with respect to said intended direction of operative travel are rotatable during operation in opposite senses.

Furthermore the invention provides a method of working the soil with the aid of a rotatable downwardly and rearwardly inclined plough body, wherein the soil is cut loose and the loosened slice of soil is inverted and displaced upwards and deposited in the inverted state in the furrow made by the first cutting.

For a better understanding of the invention and to shown how the same may be carried into effect, reference will now be made, by way of example, to the accompanying drawings in which:

FIG. 3 is a view taken in general on the line III—III in FIG. 2 so that it is in section with the exception of one cultivating member, which one member is shown in full.

Figure 1:
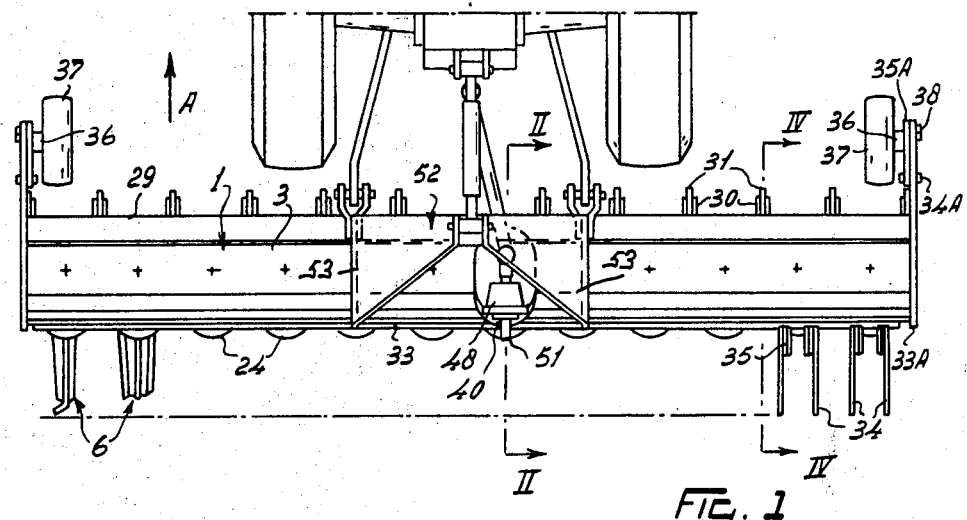
FIG. 1 is a plan view of a soil cultivating device.

The soil cultivating device illustrated in the Figures is a plough having a frame and a plurality of rotatable soil cultivating members in the form of plough bodies journalled in this frame. In detail, the device has a hollow frame beam 1 extending transversely of the intended direction of operative travel A of the device and consisting of two identical lower and upper portions 2 and 3 clamped to one another at flanges by bolts. 4. In the frame beam 1 are journalled eleven upwardly extending shafts 5 and one shaft 5A of rotatable soil cultivating members that are plough bodies 6, spaced apart by a center-to-center distance of preferably 25 cms. In the working position of the device the frame beam 1 is disposed, as is shown in FIG. 2, so that the center lines a, forming the rotary axes of the twelve bodies, 6, of the shafts 5 and 5A are at an angle of at least 40° to the horizontal.

The shaft 5A is located near the center of the frame beam 1. Each of the shafts 5, and the shaft 5A, is provided near its lower end with a shoulder 7 holding a ball bearing 8 disposed around the shaft. The ball bearing 8 is in a bearing housing 9, which is provided with a flange at the top. This flange is fastened with the aid of screw bolts 10, which can be inserted from the outside, to the bottom of the lower portion of the hollow frame beam 1 so that a downwardly extending cylindrical part of the bearing housing projects through a corresponding opening out of the frame beam 1.

Each shaft 5, and the shaft 5A, carries a sleeve 11 resting on the ball bearing 8. A pinion 12 fastened to the shaft by means of key-ways bears on the top of this sleeve 8. The pinion 12 is fixed in place by means of a circlip 13. The circlip 13 is surrounded by a protective ring 14 which extends beyond the top of the hub of the pinion 12 and on which bears a spacer ring 14A (FIG. 4) of 15 (FIG. 2) arranged around the shaft. Above the top of the spacer ring 14A or 15 the shaft has a ball bearing 16, which is arranged, for the shafts 5, in a bearing housing 17. This bearing housing 17 is fixed in a corresponding opening in the top of the upper portion 3 of the hollow frame beam 1 by means of screw bolts 18, which can be inserted from the outside. The pinions 12 on the shafts of neighboring rotatable plough bodies 6 are drivably in mesh with one another.

Figure 2:
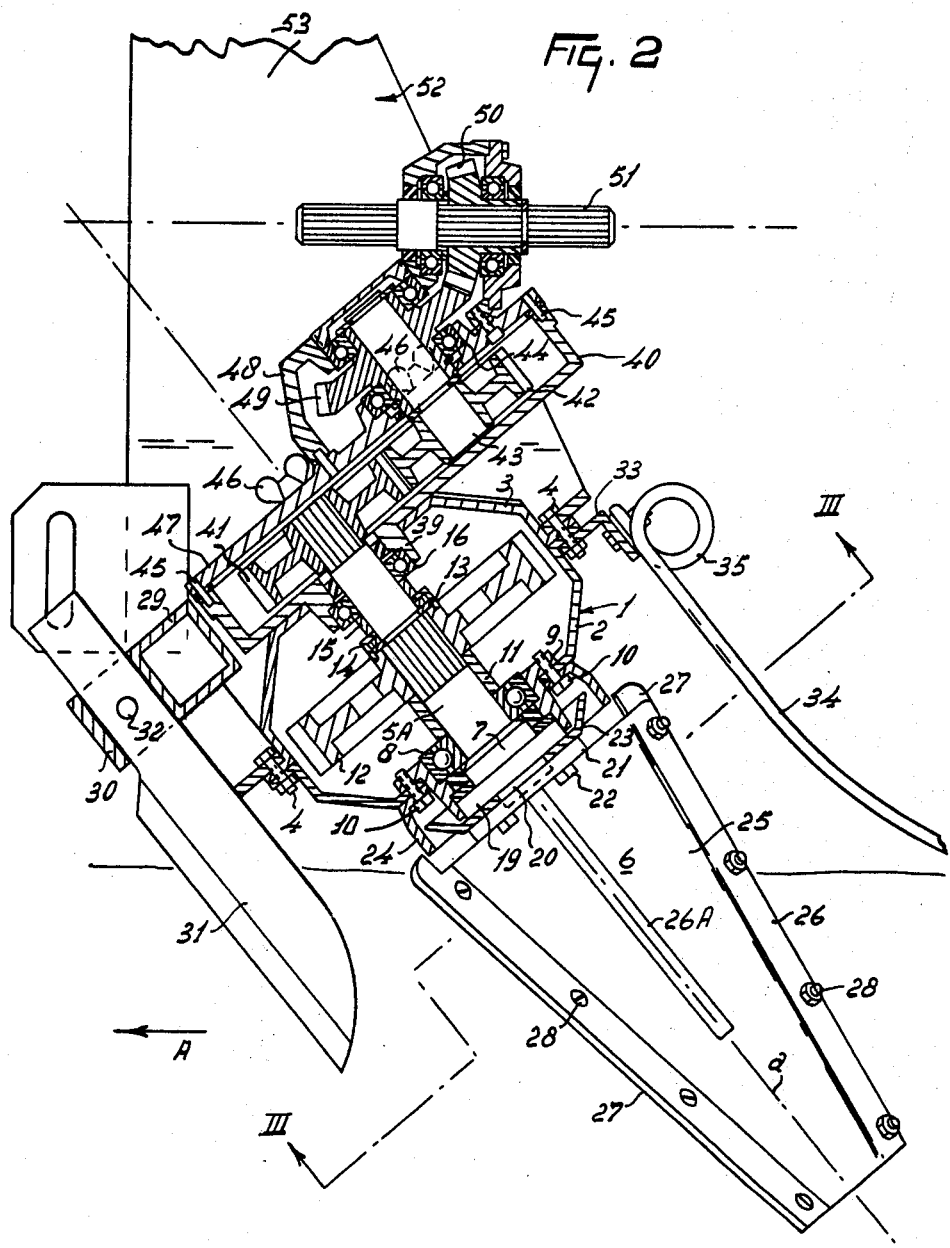
FIG. 2 is a sectional side view taken on the line II—II in FIG. 1 and on a larger scale.

As shown in FIG. 2, the shaft 5A of the rotatable plough body 6 located near the center of the frame beam 1 has its supporting bearing 16 disposed in a bearing housing 39 which forms part of the bottom of the gear box 40 which is secured to the top of the frame beam 1. The top end of the shaft 5A extends into the gear box 40 and is provided inside the gear box with an exchangeable pinion 41 which is drivably in mesh with an exchangeable pinion 42 on a shaft 43 which is rotatably supported in a bearing 44 in a cover plate 47 arranged on the top of the gear box 40 by means of locating pins 45 and wing nuts 46. The shaft 43 extends into a gear box 48 fastened to the cover plate 47 and inside this gear box it is provided with a bevel gear wheel 49 which is adapted to co-operate with a bevel gear wheel 50 on a shaft 51 extending in the direction of travel A and journalled in the gear box 48. The shaft 51 projects from the front and rear of the gear box 48 and has keyways at its projecting ends so that the front end can be coupled through an auxiliary shaft with the power take-off shaft of a tractor, whereas the rear end may serve for driving further implements to be coupled with the rotary plough, such as seed or fertilizer dispensers.

The lower part of each shaft 5, and of the shaft 5A, is provided with a circular supporting part 19 which is located substantially inside the cylindrical part of the bearing housing 9 mentioned earlier, as is shown in FIGS. 2 and 4. This supporting part 19 is provided with a centering member 20 that co-operates with a centering opening in a fastening portion 21. The fastening portion 21, like the supporting part 19, has a circular shape and, as is shown in FIGS. 2 and 3, it has a diameter slightly exceeding that of the supporting part. The fastening portion 21 is secured by bolts 22 to the supporting part 19 with the centering member 20 on the supporting part located in the centering opening of the fastening portion.

Between the fastening portion 21 and the supporting part 19 is located a circular plate 23 having at its circumference a bent-over rim extending upwardly into an annular, downwardly extending protective screening member 24 which is secured to the bottom of frame beam 1 by means of the bolts 10 serving to secure the bearing housing 9.

Each plough body 6 comprises a blade supporting member 25 formed from flat material that is secured to the fastening part 21 and that extends to the rear in downward direction. Preferably this blade support 25 is made from cast material. The blade support 25 is disposed so that its longitudinal center line is in line with the longitudinal center line a of the shaft 5 or 5A forming the rotary axis of the plough body 6. The blade support 25 has straight sides tapering towards the free end with respect to the longitudinal center line a, while near the center diametrically opposite ribs 26A extend to approximately midway the blade support 25, their width decreasing in downward direction. At the top the blade support 25 has a width approximately corresponding to the diameter of the annular screening member 24 and an opposite sides it has a bent over part 26 extending in the intended direction of operative rotation of the plough body 6 so that this part is at an angle of about 75° to the longitudinal plane A—A (FIG. 3) going through the center line of the body 6. Viewed in the direction of the rotary axis of the plough body (FIG. 3), the blade support 25 has a S-shaped cross-section, the size of which decreases in downward direction. The bent-over parts 26 cover the whole length of the blade support 25 and carry each at each edge a plate 27 forming a knife-like member so that these plates 27 are the blades that are supported by the support 25. Each plate 27 is releasably held in position by means of bolts 28.

Figure 4:
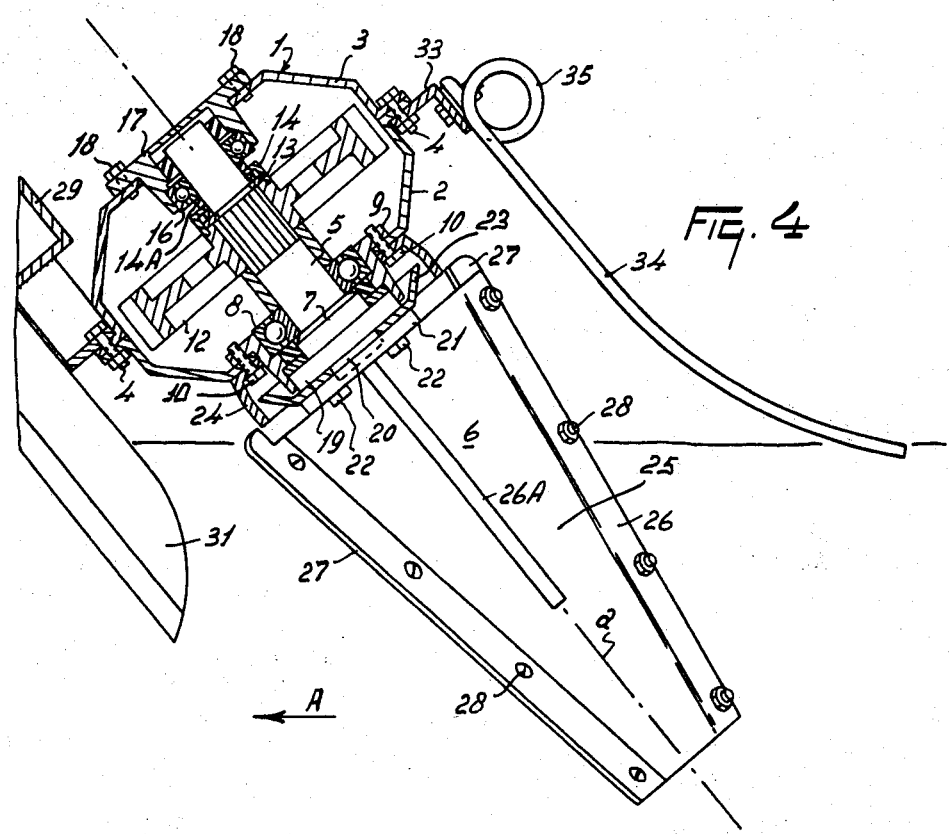
FIG. 4 is a sectional view taken on the line IV—IV in FIG. 1 and on a larger scale.

From FIGS. 2 and 4 it will be seen that the plates 27 carried by the bent-over parts 26 extend to above the lower side of each annular screening member 24 and to this end they have each a recess such that the sides of the plates facing each member 24 extend into close proximity of the member 24. The outer edges of the plate 27 are rounded off at the top.

FIG. 2 shows that the lower edges of the plates 27 are level with the lower edge of the blade support 25.

By means of the intermeshing pinions 12 arranged in the hollow frame beam 1, alternate rotatable plough bodies 6 rotate in the same direction. Considering each adjacent pair of plough bodies 6 that rotate in the same sense, the blade support 25 of one is angularly off-set about its shaft, with respect to the blade support of the other, through the width of one tooth of a pinion 12 (see, in FIG. 3 and with respect to the direction of travel A, the left-hand and the central, or the central and the right-hand body 6, or the remaining two bodies 6 that are visible in this Figure). In this way the lines of connection between the parts 26 and the plates 27 engaging the soil during operation of each two adjacent plough bodies 6 rotating in the same sense are at an angle of about 25° to one another.

At the front, near the top of the hollow frame beam 1, a carrier 29 covers the whole length of the frame beam 1. This carrier 29 is provided on the front, at the ends and in between the ends, with sleeves 30. The sleeves 30 accommodate fastening portions of knife coulters 31 which are adjustable with respect to the beam 1 in a direction of height by means of bolts 32. The knife coulters are disposed so that they extend in planes that are at least substantially parallel to planes containing the rotary axes a of the plough bodies 6. The coulters 31 located between the ends of the carrier 29 are located, viewed in the direction of travel a, in front of and between two relatively co-operating plough bodies 6.

The plough described above operates as follows. During operation the plough is coupled by means of the trestle 52 with the three-point lifting device of a tractor and the rotatable plough bodies 6 are driven through the transmission gear described above in the directions indicated by curved arrows A in FIG. 3 as the plough as a whole is propelled in the direction indicated by the straight arrow A. The working depth of the rotatable plough bodies 6 as well as that of the knife coulters 31 can be adjusted at the front of the frame beam 1 with the aid of the vertically adjustable ground wheels 37. During the operative travel of the plough the respective coulters 31 cut loose the sides of a slice of soil for each rotating plough body 6. The earth of the slice of soil cut loose at the sides is cut up into lumps by the knife-like plates 27 carried by the blade supports 25. During the rotation of the plough body 6 the detached lump of soil is caught along by the ribs 26A and owing to the inclined position of the cutting members with respect to the rotary axis a of each plough body, and to the inclined disposition of this rotary axis, an upward displacement of the soil occurs, while the blade support 25 forms a guide member. On the top and rear sides of each plough body 6 the lump of soil thus displaced is inverted and deposited in the fresh furrow. While negotiating a bend the plough bodies co-operate with the resilient tines 34, which operate as soil retainers and at the same time as crumbling members. Owing to the inclined position of the respective plough bodies 6 the soil is displaced over a comparatively short distance so that the power required is comparatively low. Since immediately neighbouring plough bodies are rotating in opposite senses and describe overlapping paths, the machine has a quiet run, which is further enhanced because the plate-shaped blade supports 25 of adjacent plough bodies that rotate in the same sense are disposed with a phase difference of about 15°. The speed of rotation of the respective plough bodies can be varied to suit the intended operation and the nature of the soil with the aid of the exchangeable pinions 41 and 42, which constitute a change-speed gear. In order to exchange the pinions the cover plate 37 with the gear box 48 can be removed after the wing nuts 46 have been loosened. In the plough as illustrated in the Figures the shafts are set at an angle of about 40°, but they may be at a larger or smaller angle to the horizontal.

While various features of the soil cultivating device that has been described, and that is illustrated in the drawings, will be set forth in the following claims as inventive features, it is to be noted that the invention is not necessarily limited to these features and that is encompasses all of the features that have been described both individually and in various combinations.

What we claim is:

1. A soil cultivating device comprising a frame and a plurality of rotatable plough bodies journalled for rotation on said frame, said bodies being arranged in a row that extends transverse to the direction of travel and driving means connected to rotate neighboring bodies in relative opposite directions, each body being mounted for rotation about an axis that extends forwardly and upwardly at an inclined angle with respect to the normal direction of travel, said body comprising an elongated downwardly tapering support member having a longitudinal axis which co-extends with the rotary axis thereof, said support member having a generally flat central part with angled side edge parts, each side part extending straight and at an angle substantially less than 90° with respect to the plane of said central part, which extends beyond said support member, said side parts mounting soil cutting blades that extend substantially along the entire length of the side parts, whereby lumps of soil are cut during rotation, raised by said plough bodies, inverted and deposited in the furrow being formed, said side parts and blades converging towards one another and said center line in a downward direction.

2. A soil cultivating device as claimed in claim 1, wherein said side parts are bent over at an angle of about 75° to said plane.

3. A soil cultivating device as claimed in claim 2, wherein viewed in a direction along the rotary axis of said body, the bent over parts extend substantially parallel to one another.

4. A soil cultivating device as claimed in claim 1, wherein diametrically opposed ribs are located on the surfaces of said central part.

5. A soil cultivating device as claimed in claim 4, wherein said ribs extend downwardly to points about midway the length of said support member and the width of at least one of said ribs decreases in a downward direction.

6. A soil cultivating device as claimed in claim 1, wherein said blades are mounted on said parts side with releasable fastening means.

7. A soil cultivating device as claimed in claim 1, wherein said support member has an upper fastening portion and a protective plate that extends beyond said fastening portion at the top of the support member, a protective screen for said fastening portion being located adjacent said fastening portion and surrounding said plate.

8. A soil cultivating device as claimed in claim 7, wherein a recess in each blade receives said screen and the top of said blade is rounded off at the edge a distance from said screen.

9. A soil cultivating device as claimed in claim 1, wherein said bodies are arranged in a row that extends transverse to the direction of travel and neighboring plough bodies are positioned to work overlapping furrows.

10. A soil cultivating device comprising a frame and a plurality of rotatable plough bodies journalled for rotation on a hollow portion of said frame, said bodies being arranged in a row that extends transverse to the direction of travel and driving means connected to rotate neighboring bodies in relative opposite directions, each body being mounted on a shaft for rotation about an axis that extends forwardly and upwardly at an inclined angle with respect to the normal direction of travel, said body tapering downwardly and including an elongated support member having a longitudinal center axis which co-extends with the shaft of said body, said support member having a central part that is genrally flat and two opposite bent over side edge parts that extend angularly outwardly from said central part, said side parts converging towards one another, each part being straight and angled substantially less than 90° with respect to the plane of the central part which extends beyond said support member, said side parts mounting soil cutting blades that co-extend with the edges of the side parts to converge towards said center axis, said side parts and blades converging downwardly towards one another and said center axis.

11. A soil cultivating device as claimed in claim 10, wherein gears on said shafts comprise intermeshing straight toothed pinions and said shafts are housed in a hollow frame beam of the frame.

12. A soil cultivating device as claimed in claim 11, wherein the blades of adjacent support members are offset relative to one another, the longitudinal planes passing through the longitudinal center lines of the nearest support members that rotate in the same direction being at an acute angle to one another.

13. A soil cultivating device as claimed in claim 10, wherein knife coulters are located between neighboring rotatable plough bodies.

* * * * *